(12) United States Patent
Ekambaram et al.

(10) Patent No.: US 10,713,485 B2
(45) Date of Patent: Jul. 14, 2020

(54) OBJECT STORAGE AND RETRIEVAL BASED UPON CONTEXT

(71) Applicant: International Business Machines Corporation, Armonk, NY (US)

(72) Inventors: Vijay Ekambaram, Chennai (IN); Shivkumar Kalyanaraman, Bangalore (IN); Anirban Laha, Chinsurah (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/639,174

(22) Filed: Jun. 30, 2017

(65) Prior Publication Data
US 2019/0005327 A1 Jan. 3, 2019

(51) Int. Cl.
| | | |
|---|---|---|
| *G06K 9/00* | (2006.01) | |
| *G06T 19/00* | (2011.01) | |
| *G06F 3/01* | (2006.01) | |
| *G06F 16/583* | (2019.01) | |
| *G06K 9/72* | (2006.01) | |
| *G06F 16/432* | (2019.01) | |

(52) U.S. Cl.
CPC .......... *G06K 9/00664* (2013.01); *G06F 3/011* (2013.01); *G06F 16/434* (2019.01); *G06F 16/583* (2019.01); *G06F 16/5838* (2019.01); *G06K 9/72* (2013.01); *G06T 19/006* (2013.01)

(58) Field of Classification Search
CPC .......... G06K 9/00664; G06F 17/30047; G06F 17/30256
See application file for complete search history.

(56) References Cited

U.S. PATENT DOCUMENTS

| | | | |
|---|---|---|---|
| 5,737,533 | A | 4/1998 | de Hond |
| 6,144,388 | A | 11/2000 | Bornstein |
| 6,154,723 | A | 11/2000 | Cox et al. |
| 7,814,122 | B2 | 10/2010 | Friedrich et al. |
| 7,953,739 | B2 | 5/2011 | York et al. |
| 8,626,784 | B2 | 1/2014 | Beaudreau et al. |
| 8,644,842 | B2 | 2/2014 | Arrasvuori et al. |

(Continued)

FOREIGN PATENT DOCUMENTS

| | | |
|---|---|---|
| EP | 3103088 A1 | 12/2016 |
| JP | 2002271817 A | 9/2002 |

*Primary Examiner* — Grace Q Li
(74) *Attorney, Agent, or Firm* — Ference & Associates LLC (57) ABSTRACT

One embodiment provides a method, including: capturing at least one image of an object that is of interest to a user; identifying and capturing an environmental context of the object, wherein the environmental context (i) identifies a plurality of features of the environment surrounding the object, and (ii) comprises context captured from different modalities; storing the at least one image and the environmental context of the object, wherein the storing comprises indexing the object within the remote storage location using the identified features of the environment; receiving a request for the at least one image of the object; accessing the remote storage location and retrieving the at least one image of the object, wherein the retrieving comprises (i) searching for the at least one of the plurality of features and (ii) retrieving the at least one image of an object; and displaying the at least one image.

14 Claims, 3 Drawing Sheets

(56) References Cited

U.S. PATENT DOCUMENTS

| | | | |
|---|---|---|---|
| 9,197,864 B1 * | 11/2015 | Starner | H04N 5/23222 |
| 2001/0056506 A1 * | 12/2001 | Munetsugu | G06F 16/40 |
| | | | 719/310 |
| 2002/0026388 A1 | 2/2002 | Roebuck | |
| 2002/0147638 A1 | 10/2002 | Banerjee et al. | |
| 2002/0156703 A1 | 10/2002 | Abekawa | |
| 2008/0071559 A1 | 3/2008 | Arrasvuori | |
| 2008/0147488 A1 | 6/2008 | Tunick et al. | |
| 2009/0237564 A1 | 9/2009 | Kikinis et al. | |
| 2010/0103075 A1 | 4/2010 | Kalaboukis et al. | |
| 2010/0306120 A1 | 12/2010 | Ciptawilangga | |
| 2010/0306121 A1 | 12/2010 | Ciptawilangga | |
| 2011/0029903 A1 | 2/2011 | Schooleman et al. | |
| 2011/0213664 A1 | 9/2011 | Osterhout et al. | |
| 2012/0106857 A1 | 5/2012 | Schneiderman | |
| 2012/0290401 A1 | 11/2012 | Neven | |
| 2013/0326406 A1 | 12/2013 | Reiley et al. | |
| 2014/0052550 A1 | 2/2014 | Glazer et al. | |
| 2015/0052146 A1 * | 2/2015 | Soon-Shiong | H04L 67/10 |
| | | | 707/740 |
| 2015/0347595 A1 * | 12/2015 | Norman | G06F 17/30867 |
| | | | 726/28 |
| 2016/0378328 A1 | 12/2016 | Abrahams et al. | |
| 2017/0206691 A1 * | 7/2017 | Harrises | G06T 11/60 |
| 2018/0165375 A1 * | 6/2018 | Silkey | G06F 3/0481 |

\* cited by examiner

OBJECT STORAGE AND RETRIEVAL BASED UPON CONTEXT

BACKGROUND

People find or identify objects of interest while performing daily activities. For example, a person may identify a phone of interest when talking to a friend who has the phone. As another example, the person may identify a camera of interest when talking to a sales associate about different cameras. Unfortunately, even if the person tries, the person may be unable to recall enough details about the object of interest to find the object at a later time. For example, a person may attempt to remember the features of the camera that was of interest, but may not remember the make or model of the camera. However, the person may be able to recall details about the context related to when he/she identified the object. For example, the person may remember that the sales associate's name was Jack and that it was on a Monday when the person saw the camera of interest. In conventional systems, these context details may be useless in trying to identify more information about the actual object of interest.

BRIEF SUMMARY

In summary, one aspect of the invention provides a method, comprising: utilizing at least one processor to execute computer code that performs the steps of: capturing at least one image of an object that is of interest to a user; identifying and capturing an environmental context of the object, wherein the environmental context (i) identifies a plurality of features of the environment surrounding the object and (ii) comprises context captured from different modalities; storing, in a remote storage location, the at least one image and the environmental context of the object, wherein the storing comprises indexing the object within the remote storage location using the identified features of the environment; receiving a request for the at least one image of the object, wherein the request comprises at least one of the plurality of features; accessing the remote storage location and retrieving the at least one image of the object, wherein the retrieving comprises (i) searching for the at least one of the plurality of features and (ii) retrieving the at least one image of an object corresponding to the at least one of the plurality of features; and displaying the at least one image.

Another aspect of the invention provides an apparatus, comprising: at least one processor; and a computer readable storage medium having computer readable program code embodied therewith and executable by the at least one processor, the computer readable program code comprising: computer readable program code that captures at least one image of an object that is of interest to a user; computer readable program code that identifies and captures an environmental context of the object, wherein the environmental context (i) identifies a plurality of features of the environment surrounding the object and (ii) comprises context captured from different modalities; computer readable program code that stores, in a remote storage location, the at least one image and the environmental context of the object, wherein the storing comprises indexing the object within the remote storage location using the identified features of the environment; computer readable program code that receives a request for the at least one image of the object, wherein the request comprises at least one of the plurality of features; computer readable program code that accesses the remote storage location and retrieving the at least one image of the object, wherein the retrieving comprises (i) searching for the at least one of the plurality of features and (ii) retrieving the at least one image of an object corresponding to the at least one of the plurality of features; and computer readable program code that displays the at least one image.

An additional aspect of the invention provides a computer program product, comprising: a computer readable storage medium having computer readable program code embodied therewith, the computer readable program code executable by a processor and comprising: computer readable program code that captures at least one image of an object that is of interest to a user; computer readable program code that identifies and captures an environmental context of the object, wherein the environmental context (i) identifies a plurality of features of the environment surrounding the object and (ii) comprises context captured from different modalities; computer readable program code that stores, in a remote storage location, the at least one image and the environmental context of the object, wherein the storing comprises indexing the object within the remote storage location using the identified features of the environment; computer readable program code that receives a request for the at least one image of the object, wherein the request comprises at least one of the plurality of features; computer readable program code that accesses the remote storage location and retrieving the at least one image of the object, wherein the retrieving comprises (i) searching for the at least one of the plurality of features and (ii) retrieving the at least one image of an object corresponding to the at least one of the plurality of features; and computer readable program code that displays the at least one image.

A further aspect of the invention provides a method, comprising: utilizing at least one processor to execute computer code that performs the steps of: identifying a level of interest of a user with respect to an object; capturing, based upon the level of interest exceeding a predetermined threshold, at least one image of the object and context information related to the environment surrounding the object; storing, in an accessible data storage location, the at least one image of the object and the context information, wherein the context information is associated with the object in the accessible data storage location and wherein the at least one image is organized within the accessible data storage location based upon the context information; upon receiving a search query including at least a subset of the context information, searching the accessible data storage location for an image of an object corresponding to the at least a subset of the context information; and retrieving and displaying the at least one image of the object corresponding to the at least a subset of the context information.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Relying on a person's memory to remember details about an object of interest may result in forgetting details, missing details, misremembering details, and the like. Accordingly, people may take pictures and make notes regarding the object in order to remember the salient or desired features or details of the object. Thus, when the person wants to revisit the object of interest, the person can access the stored images and/or notes. However, conventional data storage systems may not provide a good method or technique for storing the images and/or notes that are intuitive for the person to access later. For example, conventional data storage systems may automatically name a file with an identifier that is non-descriptive, for example, a series of numbers, letters, and the like. The user can rename the file to something that may be more descriptive, for example, the name of the object. However, the user may be unable to remember these details later. For example, the user may be unable to remember the name of the object. The user may also create different file folders or file structures in an effort to make it easier to find at a later time. However, this can be very time consuming and tedious, especially if the person has many different files. Additionally, if the person never accesses the file at a later time, the whole process may be a waste of time.

Additionally, if a person wants to compare more than one object, for example, objects of the same type but different models, the user has to either have physical access to the objects at the same time or access to the previously captured images/notes of one or more of the objects. If the person has to access images of one or both of the objects, the person may find that images and/or notes of a particular feature were not captured. The person is then unable to compare the features that are of interest to the person. The person may then have to rely on memory to remember the features, other user reviews, find the physical object again, or ignore the feature altogether. This can be inaccurate, time consuming, unfeasible, or undesirable.

Additionally, when comparing more than one object, the person may like to know which product fits the user's preferences more accurately. Conventionally, the person either has to rely on a sales associate to explain which object has features that correspond to the user's preferences. Unfortunately, not all sales associates are knowledgeable about features of multiple products. Additionally, the sales associate may have a bias for one model versus another model and may let that bias sway the sales associate's recommendation. Alternatively, the person may have to comb the specifications for each object and identify which object has the desired specification. Unfortunately, specification lists may be long and hard to understand. Additionally, the desired specification may not be included on a specification list for an object. Finally, even if they are included on the specification list, the details of the specification may be incomprehensible to the person, resulting in confusion and frustration.

Accordingly, an embodiment provides a method of identifying an object of interest and storing images and context related to the object for subsequent retrieval. The system may capture one or more images and/or details of an object that is of interest to a user. The interest of the user may be determined using different metrics, for example, the length of time the user interacts with the object, a similarity of the object to other objects, previously requested or purchased objects by the user, and the like. The system may also identify and capture an environmental context of the object. The environmental context may identify a plurality of features of the environment surrounding the object. For example, the system may identify a date and time related to when the object was encountered, a location where the object was encountered, other people who were around at the time the object was encountered, and the like. The environmental context may be captured or derived from different modalities. For example, the system may capture audio input, may capture location information using sensors of a device, may capture images, and the like, in order to identify an environmental context of the object.

The system may then store the image(s) of the object in a remote storage location for retrieval at a later time. The system may also store the environmental context or identified features of the environment in the data storage location. The system may use the identified features to index the image(s) of the object within the storage location. In other words, the system may associate the environmental context with the object and images of the objects and use the environmental context to label or tag the object and images. Thus, when a user requests the image of the object, the user does not have to know how the object is stored within the data storage location. Rather, the user can merely remember context clues which the system can then use to retrieve the desired object. For example, the user may remember that the object was encountered on a particular date and that a particular person was with the user when the object was encountered. The user may then provide this information to the system and the system can search the index using the provided information to find the object corresponding with that context information. Once the system has identified and retrieved the corresponding object, the system may display the one or more images of the object to the user.

The system also provides an interactive personalized shopping experience using the stored object image(s) and environmental context. When a user identifies an object image for retrieval, the system may provide the image(s) in an augmented reality environment. The user may then use this augmented reality environment to compare a virtual object (e.g., the object represented by the retrieved images) with a physical object, or one or more virtual objects compared with each other. For example, the system may provide a display with which the user can see the images of the retrieved object while still being able to see the physical object in the physical world. The augmented reality system may also provide a way to technique for providing a recommendation to the user based upon identified user preferences. For example, the system may provide a scoring system that scores each of the virtual and/or physical objects based upon the user preferences. The system may then provide a recommendation of the object matching the one or more user preferences.

Such a system provides a technical improvement over current systems for storing and accessing information. The system provides a technique for capturing images or details of an object of interest and identifying context associated with that object. The context can then be used by system to index the object in order to more quickly find and access the object at a later time. In other words, the systems and methods as described herein provide a technique which enables a user to effectively store, fetch, and render images and features of objects of interest to the user in a data storage location which is intelligently indexed based upon the context of the object. Additionally, the systems and methods as described herein provide a technique for comparing objects even if both objects are not physically present at the same time. The systems and methods as described herein can also provide a user with a comparison or recommendation of an object based upon preferences of the user.

Figure 1:
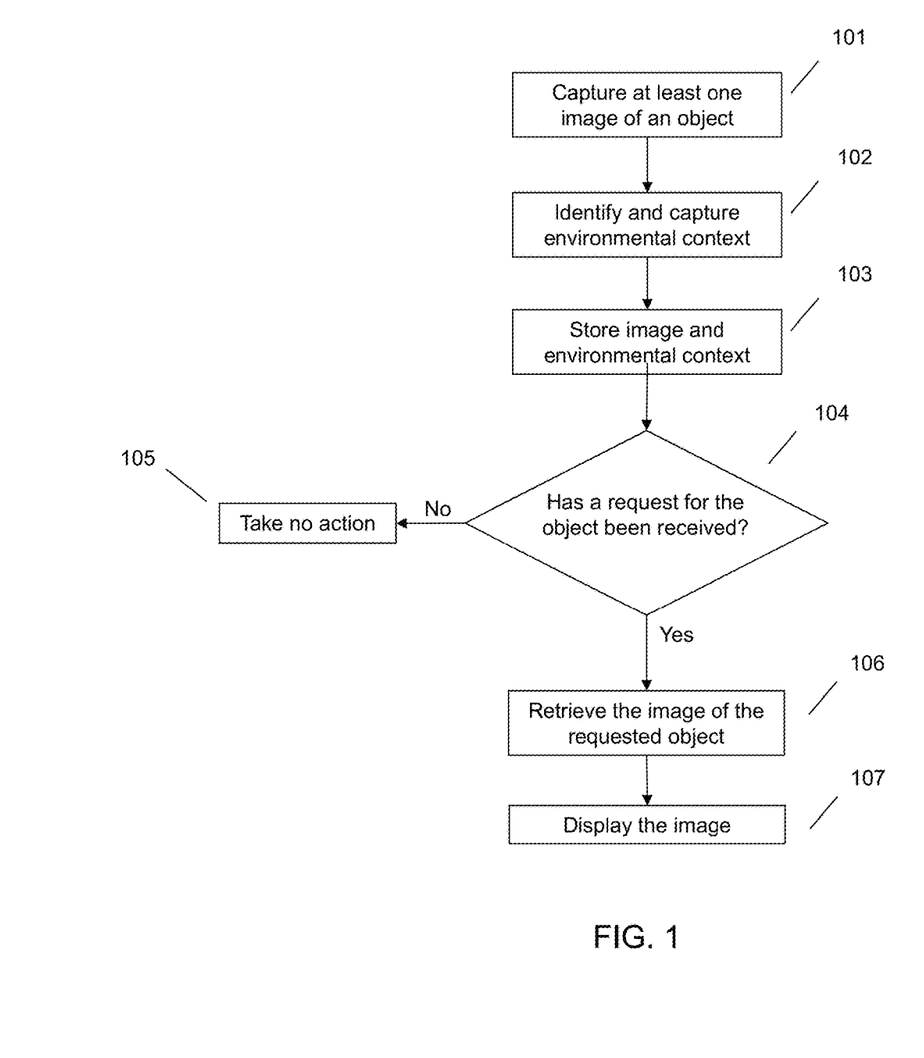
FIG. 1 illustrates a method of identifying an object of interest and storing images and context related to the object for subsequent retrieval.
Figure 2:
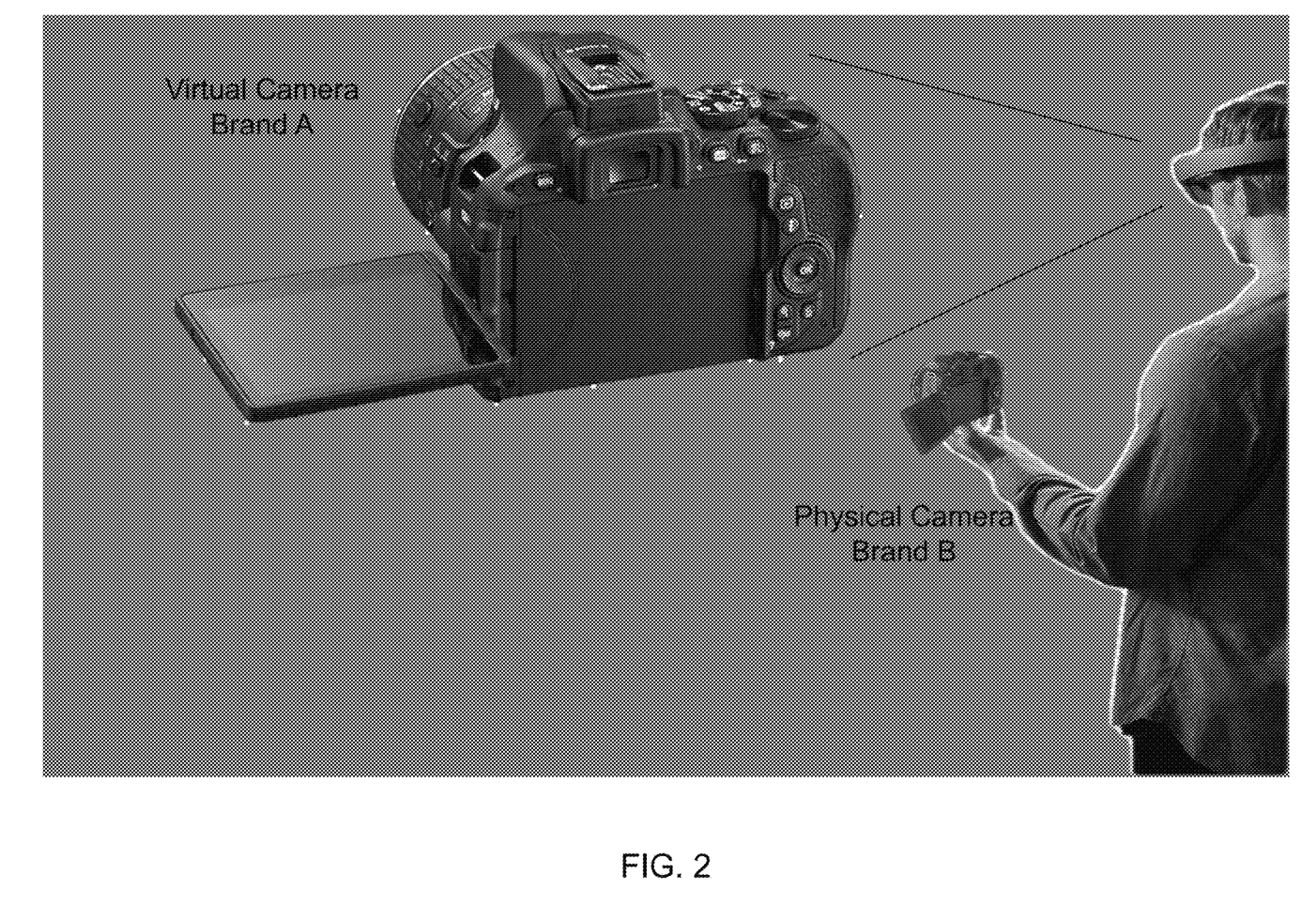
FIG. 2 illustrates an example augmented reality with a real object and an object retrieved from storage.

Referring now to FIG. 1, at 101 the system may capture at least one image of an object that is of interest to a user. The object may include any physical or virtual object that a user encounters or views. For example, the object may include an electronic device that the user encounters in the physical world (e.g., while shopping, as seen on another person, etc.). As another example, the object may include a piece of furniture that the user views on an Internet website.

The system may capture more than one image of the object, for example, the system may capture images of different views of the object, different images having different zoom levels, and the like. The image may not be a static image, for example, in the case of a camera picture or other still picture, rather, the image may include a video of the object. The system may also capture or generate a hologram or three-dimensional (3D) image of the object. For example, the system may capture multiple images and may stitch the images together to generate a hologram or 3D image of the object which may be manipulated to view different angles or features of the object. As an example, a user may provide input to zoom in on a particular location of the object or rotate the object to view a different side. The holograms or 3D images of the object may also be retrieved from a merchant or website associated with the object. For example, a retailer website may include a hologram or 3D image of the object that can be manipulated.

The system may identify whether an object is of interest to a user using different techniques. The system may receive a trigger event from the user designating that an object is an object of interest. For example, the user may provide user input (e.g., by tapping on an electronic device, gesturing, selecting a "like" button, etc.) that indicates to the system that the user is interested in the object. The user input or trigger event may be previously identified by the system as the user input or trigger event that designates an object of interest. For example, the system may include a particular button or icon that is an "interested" button or icon. The user may also program the system that a particular trigger event should be identified as designating an object of interest. For example, the user may program a particular gesture as identifying an object of interest.

The system may also identify an object of interest using continuous input and selective decision-making. In other words, the system may continually receive input and then determine whether or not the received input should be treated as an object of interest. The decision making in making the determination may be based upon a detected level of interest of the user. The level of interest of the user may be based upon the time of attention that the user dedicates to an object. The system may compare the time of attention to a predetermined threshold. An object having a time of attention meeting or exceeding the predetermined threshold may be determined to be an object of interest. The system may also use an engagement level of the user during an encounter of the object. The system may determine that a user is very engaged in the discussion of an object, for example, based upon characteristics of the user's voice (e.g., pitch, volume, etc.), characteristics of a user's gaze (e.g., pupil dilation, location of user's gaze with respect to the object, etc.), and the like. A user engagement reaching or exceeding a particular threshold may indicate an object of interest.

The system may also use a similarity to a recently viewed or encountered object to determine whether the object is of interest to a user. For example, a user may be shopping for a new camera and may be viewing different cameras on different days. The system may determine that the user just viewed a camera yesterday, so the camera the user is currently viewing may be an object of interest. To determine the similarity of one object to another, the system may use a cosine similarity algorithm or technique. The system may also identify a similarity to a previously searched or requested object. As an example, assume a user has accessed an Internet website and searched for a smartphone. Subsequently, when the user encounters any smartphone in the physical or virtual world, the system may identify the encountered smartphone as an object of interest. The similarity to a searched object may also be based upon the user searching for an object within the remote data storage location, as described in more detail below.

At 102 the system may identify and capture an environmental context of the object. The environmental context may identify features of the environment surrounding the object when the object is encountered. The environmental context may also be used in identifying or confirming an interest level of the user in the object. For example, the system may use behavioral analytics to determine how the user is interacting with or acting around the object. As another example, the system may use natural language parsing and sentiment analysis techniques on audio of a user to identify how the user feels about the object.

Context information may include any timestamp information (e.g., time when the object was encountered, day of the week, season, month, etc.), location information, (e.g., GPS coordinates of where was the object encountered, home, work, etc.), identification of other objects in the surrounding environment (e.g, people, things, animals, etc.), events corresponding to or associated with encountering the object (e.g., a birthday party, a meeting, etc.), characteristics of the object (e.g., model, make, type, features, etc.), discussion topics related to the object (e.g., recommendations, reviews, etc.), and the like. The context information may be captured and identified using different techniques, for example, capturing timestamp information, capturing location information, object identification techniques, facial recognition techniques, event recognition (e.g., accessing a calendar of the user, parsed from speech, captured from social media posts, etc.), speech recognition and parsing techniques, image capturing and parsing techniques, and the like.

The context may be identified and captured from a plurality of modalities. In other words, the system does not only use images to identify an environmental context of the object. For example, the system may capture audio which may be used to identify another person present when the object was encountered, words or phrases spoken by the user, and the like. The system may also capture context from sensors of one or more devices. For example, the system may capture location context information using global positioning system (GPS) data, wireless triangulation information, and the like. Additionally, the system may capture images of the environment to identify features of the environment.

The environmental context may include features of the environment that may be helpful in later retrieving the object from a data storage location, as explained in more detail below. Accordingly, the system may analyze the features or context to determine whether the features or context will be useful for later retrieval. To determine if the features will be useful the system may parse the context, using the techniques discussed above (e.g., behavioral analytics, natural language parsing, etc.) or other techniques. The system may attempt to identify features which the user may later associate with the object. For example, if the user is in a store, the user may remember the name of the sales associate or the store when later remembering the object. Accordingly, the system may determine that the name of the sales associate or store may be features of the environment that may be useful for later retrieval. Determining useful features may be based upon a ranking of the features. For example, the system may assign a score to each feature based upon an expected usefulness. The system may then only keep or capture the features meeting or exceeding a predetermined score or ratio (e.g., the top 10% of the features are captured, the features having a predetermined score are captured, etc.).

At 103, the system may store the at least one image and the environmental context of the object in a remote data storage location. For example, the system may store the information in the cloud, in a personal profile of the user, and the like. Storing the information may include indexing the object within the data storage location using the identified features of the environment. The indexing provides a technique for storing the object in an easily retrievable format based upon the context. In other words, the features are associated with the object and images of the object within the data storage location, and these features are then used as the index for finding the object or images of the object.

The system may then determine, at 104, if a request for an object has been received. For example, a user may provide an input that indicates the user is trying to find or access the object from the data storage location. The request may identify one or more features of the object. Accordingly, even if the user does not remember exact details about the object, the user can still provide a request to access the object based upon contextual features of the object. For example, the user may remember that the object was encountered at work last week. Accordingly, the system may access the index to and use the identification of "work" and "last week" to search the index for an object that matches the parameters. A request may include a direct or explicit request for an object, for example, the user may say "Please access the smartphone that I looked at yesterday." Alternatively, the request may include an indirect or implicit request for an object, for example, the user may say "It would be helpful to see pictures of Bob's camera."

If a request for the object has not been received, the system may take no action at 105. If, however, a request for an object has been received, the system may access the data storage location and retrieve the object or image of the object. As briefly discussed above, accessing and retrieving the object may include searching for the object using the one or more features identified in the request. The system may then access the index to find one or more objects that correspond to the identified features. If more than one object is identified having the identified features, the system may present all the objects to the user for the user to select the desired object. Alternatively, the system may rank or weight the object based upon a context of the user and present the object which the system thinks the user is most likely trying to access. For example, if the user is currently looking at a camera, the system may provide the image of the camera that matches the identified features as opposed to the smartwatch matching the identified features.

The system may then display the retrieved image of the object to the user at 107. Displaying the one or more images of the object may simply include presenting the images on a display screen. Alternatively, the system may provide a personalized shopping environment and display the images in an augmented reality environment. The augmented reality environment may provide an environment in which the user can interact with and manipulate the images, for example, the user may rotate the image, zoom in on a particular features, and the like. The augmented reality setting may provide a setting for product visualization and comparison of one or more objects. For example, a user may select more than one object that may both be displayed within the augmented reality setting. The system may then provide a comparison of product features, for example, by showing the image of each feature side-by-side, showing a list of the features, and the like.

The system may also overlay one object on top of the other object. For example, the user may wish to see a difference in size, difference in location of features, and the like, so the user may provide input to overlay an image of one object onto the image of the other object. The system may also provide a comparison of a virtual object to a physical object, for example, referring to FIG. 2. The system may access an image of camera of Brand A, referred to as the "Virtual Camera" and provide that image to the user. The user can then hold a physical camera of Brand B. The system may then provide a comparison of the two objects, similar to the comparison of two virtual objects.

Additionally, the system may allow a user to provide input and query the system about different features or attributes of the objects. For example, the user may ask the system which object has a larger display. The system may then identify the object having the larger display. Identifying the object may include providing audio output with the name or other identifying information of the object, providing a visual selection (e.g., check mark, circling the object, etc.), and the like.

If the user provides a list of preferences, the system may also provide a recommendation as to which object may meet some, most, or all, of the identified preferences. For example, the user may want the object which has a larger display, more memory, and more connection ports. The system may then identify which object meets all or most of the preferences and identify that object to the user. Identification of the object may include generating a providing a likability score based upon the identified preferences. For example, if the object meets three out of four preferences, the system may assign the object a 75% likability score. The likability score may be provided in different formats, for example, as a percentage, ranking, score out of ten, and the like. The preferences may be weighted, for example, a user may identify one preference as being more important than another preference, and the likability score may reflect this weighting. Accordingly, the system may provide a recommendation to the user using the likability score or identified user preferences.

Figure 3:
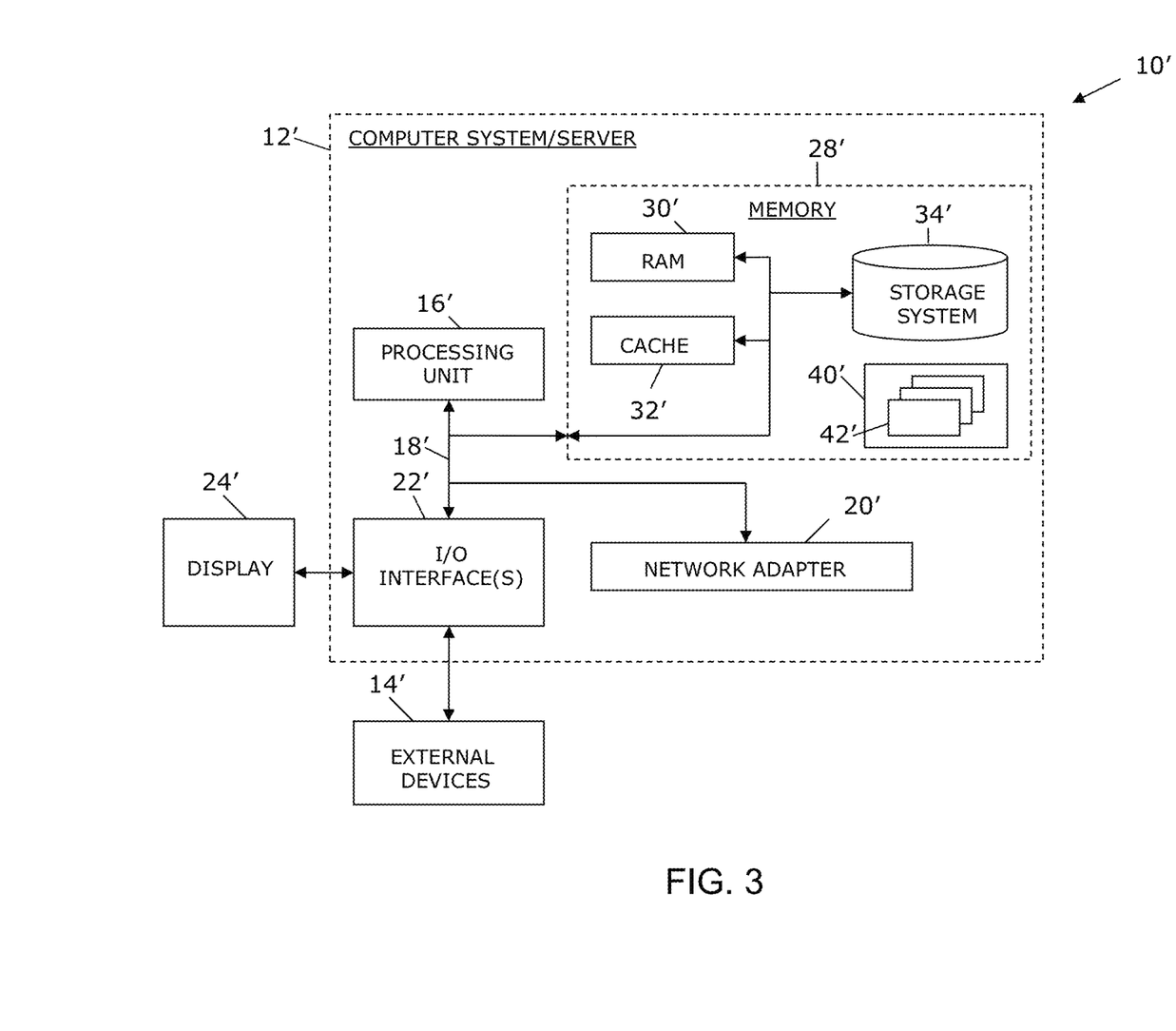
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
capturing at least one image of an object that is of interest to a user;
identifying and capturing an environmental context of the object, wherein the environmental context identifies a plurality of contextual features of the environment surrounding the object when the at least one image is captured, wherein the plurality of contextual features are captured from different modalities, wherein the identifying a plurality of contextual features comprises identifying contextual features that the user associates with the object, producing a score for each of the plurality of contextual features of the environment based upon a determined usefulness, and capturing contextual features having the score exceeding a threshold score, wherein an interest of the user with respect to the object is based upon the environmental context;
storing, in a remote storage location of the user, the at least one image and the environmental context of the object, wherein the storing comprises associating the plurality of contextual features of the environment with the object and indexing the object within the remote storage location using the identified contextual features of the environment, wherein the storing contextual features comprises storing the contextual features that comprise the score exceeding the threshold value;
receiving a request for the at least one image of the object, wherein the request comprises at least one of the plurality of contextual features;
accessing the remote storage location and retrieving the at least one image of the object, wherein the retrieving comprises (i) searching for the at least one of the plurality of contextual features and (ii) retrieving the at least one image of an object corresponding to the at least one of the plurality of contextual features; and
displaying the at least one image, wherein the displaying the at least one image comprises displaying at least one image in an augmented reality setting, wherein the displaying at least on image comprises providing a visual comparison of more than one object, wherein the displaying at least one image comprises generating and providing a likability score for the more than one object based upon identified preferences of the user.

2. The method of claim 1, wherein the capturing is responsive to user input indicating that the at least one image of the object is to be captured.

3. The method of claim 1, wherein the capturing is responsive to a detected level of interest of the user.

4. The method of claim 3, wherein the detected level of interest is based upon at least one of: time of attention given to the object, similarity to previously stored objects, previously requested objects, and an engagement of the user with respect to the object.

5. The method of claim 1, wherein the environmental context comprises a timestamp corresponding to when the at least one image was captured, a location corresponding to where the at least one image was captured, and identification of objects within the environment surrounding the object.

6. The method of claim 1, wherein the capturing an environmental context comprises identifying contextual features of the environment that will be used for later retrieval of the object.

7. The method of claim 6, wherein the identifying contextual features comprises analyzing the behavior of the user with respect to the object.

8. An apparatus, comprising:
at least one processor; and
a computer readable storage medium having computer readable program code embodied therewith and executable by the at least one processor, the computer readable program code comprising:
computer readable program code that captures at least one image of an object that is of interest to a user;
computer readable program code that identifies and captures an environmental context of the object, wherein the environmental context identifies a plurality of contextual features of the environment surrounding the object when the at least one image is captured, wherein the plurality of contextual features are captured from different modalities, wherein the identifying a plurality of contextual features comprises identifying contextual features that the user associates with the object, producing a score for each of the plurality of contextual features of the environment based upon a determined usefulness, and capturing contextual features having the score exceeding a threshold score, wherein an interest of the user with respect to the object is based upon the environmental context;
computer readable program code that stores, in a remote storage location of the user, the at least one image and the environmental context of the object, wherein the storing comprises associating the plurality of contextual features of the environment with the object and indexing the object within the remote storage location using the identified contextual features of the environment, wherein the computer readable program code that stores contextual features comprises storing the contextual features that comprise the score exceeding the threshold value;
computer readable program code that receives a request for the at least one image of the object, wherein the request comprises at least one of the plurality of contextual features;
computer readable program code that accesses the remote storage location and retrieving the at least one image of the object, wherein the retrieving comprises (i) searching for the at least one of the plurality of contextual features and (ii) retrieving the at least one image of an object corresponding to the at least one of the plurality of contextual features; and
computer readable program code that displays the at least one image, wherein the displaying the at least one image comprises displaying at least one image in an augmented reality setting, wherein the displaying at least on image comprises providing a visual comparison of more than one object, wherein the displaying at least one image comprises generating and providing a likability score for the more than one object based upon identified preferences of the user.

9. A computer program product, comprising:
a computer readable storage medium having computer readable program code embodied therewith, the computer readable program code executable by a processor and comprising:

computer readable program code that captures at least one image of an object that is of interest to a user;

computer readable program code that identifies and captures an environmental context of the object, wherein the environmental context identifies a plurality of contextual features of the environment surrounding the object when the at least one image is captured, wherein the plurality of contextual features are captured from different modalities, wherein the identifying a plurality of contextual features comprises identifying contextual features that the user associates with the object, producing a score for each of the plurality of contextual features of the environment based upon a determined usefulness, and capturing contextual features having the score exceeding a threshold score, wherein an interest of the user with respect to the object is based upon the environmental context;

computer readable program code that stores, in a remote storage location of the user, the at least one image and the environmental context of the object, wherein the storing comprises associating the plurality of contextual features of the environment with the object and indexing the object within the remote storage location using the identified contextual features of the environment, wherein the computer readable program code that stores contextual features comprises storing the contextual features that comprise the score exceeding the threshold value;

computer readable program code that receives a request for the at least one image of the object, wherein the request comprises at least one of the plurality of contextual features;

computer readable program code that accesses the remote storage location and retrieving the at least one image of the object, wherein the retrieving comprises (i) searching for the at least one of the plurality of contextual features and (ii) retrieving the at least one image of an object corresponding to the at least one of the plurality of contextual features; and computer readable program code that displays the at least one image, wherein the displaying the at least one image comprises displaying at least one image in an augmented reality setting, wherein the displaying at least on image comprises providing a visual comparison of more than one object, wherein the displaying at least one image comprises generating and providing a likability score for the more than one object based upon identified preferences of the user.

10. The computer program product of claim 9, wherein the capturing is responsive to user input indicating that the at least one image of an object is to be captured.

11. The computer program product of claim 9, wherein the capturing is responsive to a detected level of interest of the user.

12. The computer program product of claim 11, wherein the detected level of interest is based upon at least one of: time of attention given to the object, similarity to previously stored objects, previously requested objects, and an engagement of the user with respect to the object.

13. The computer program product of claim 9, wherein the capturing an environmental context comprises identifying contextual features of the environment that will be used for later retrieval of the object.

14. A method, comprising:
utilizing at least one processor to execute computer code that performs the steps of:
identifying a level of interest of a user with respect to an object, wherein the identifying comprises using behavioral analytics;
capturing, based upon the level of interest exceeding a predetermined threshold, at least one image of the object and context information related to the environment surrounding the object, wherein the context information comprises contextual features of the environment and wherein identifying contextual features of the environment comprises identifying contextual features of the environment that the user associates with the object, producing a score for each of the plurality of contextual features of the environment, wherein the score for each of the plurality of contextual features comprises a determined usefulness, and capturing contextual features from the plurality of contextual features of the object having the score exceeding a threshold score;
storing, in an accessible data storage location of the user, the at least one image of the object and the context information, wherein the context information is associated with the object in the accessible data storage location and wherein the at least one image is organized within the accessible data storage location based upon the context information, wherein the storing context information comprises storing the context information that comprises the score exceeding the threshold value;
upon receiving a search query including at least a subset of the context information, searching the accessible data storage location for an image of an object corresponding to the at least a subset of the context information; and
retrieving and displaying the at least one image of the object corresponding to the at least a subset of the context information, wherein the displaying the at least one image comprises displaying at least one image in an augmented reality setting, wherein the displaying at least on image comprises providing a visual comparison of more than one object, wherein the displaying at least one image comprises generating and providing a likability score for the more than one object based upon identified preferences of the user.

\* \* \* \* \*